United States Patent
Tsuda et al.

(10) Patent No.: US 6,525,791 B1
(45) Date of Patent: *Feb. 25, 2003

(54) COLOR LIQUID CRYSTAL DISPLAY APPARATUS FOR PRODUCING A DISPLAY HAVING A HIGH CONTRAST AND A WIDE VISUAL FIELD ANGLE

(75) Inventors: Keiji Tsuda, Shiga (JP); Shinichi Yamada, Shiga-ken (JP); Tetsuya Goto, Shiga-ken (JP); Kunihiro Hatanaka, Shiga-ken (JP)

(73) Assignee: Toray Industries, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,545

(22) Filed: Sep. 26, 1997

(30) Foreign Application Priority Data

Sep. 27, 1996 (JP) .............................. 8-255938

(51) Int. Cl.$^7$ ............................................. G02F 1/1333
(52) U.S. Cl. ........................................ 349/106; 349/122
(58) Field of Search ................................ 349/106, 110, 349/155, 141, 156, 122, 138

(56) References Cited

U.S. PATENT DOCUMENTS

| | | | | |
|---|---|---|---|---|
| 3,834,794 A | | 9/1974 | Soref ........................... 350/160 |
| 4,618,514 A | * | 10/1986 | McClelland et al. ............ 428/1 |
| 4,876,165 A | * | 10/1989 | Brewer et al. .................. 430/7 |
| 5,470,943 A | * | 11/1995 | Sakata et al. ................. 528/353 |
| 5,492,762 A | * | 2/1996 | Hirai et al. ................... 428/447 |
| 5,680,187 A | * | 10/1997 | Nagayama et al. .......... 349/110 |
| 5,706,064 A | * | 1/1998 | Fukunaga et al. ............. 349/43 |
| 5,760,857 A | * | 6/1998 | Yanagawa et al. ............. 349/43 |
| 5,815,232 A | * | 9/1998 | Miyazaki et al. ............ 349/155 |
| 5,841,498 A | * | 11/1998 | Baur et al. ................... 349/141 |
| 5,917,572 A | * | 6/1999 | Kurauchi et al. ............ 349/156 |
| 5,978,061 A | * | 11/1999 | Miyazaki et al. ............ 349/155 |
| 6,097,467 A | * | 8/2000 | Fujimaki et al. ............. 349/155 |
| 6,222,602 B1 | * | 4/2001 | Aratani et al. .............. 349/141 |

FOREIGN PATENT DOCUMENTS

| | | |
|---|---|---|
| DE | 3234110 A1 | 3/1983 |
| EP | 0 483 693 | 10/1991 |
| EP | 0 622 644 | 9/1993 |
| EP | 0 644 452 A3 | 9/1994 |
| EP | 0 644 452 A2 | 9/1994 |
| EP | 97307643.3 | 1/1998 |
| JP | 63-056625 | 11/1988 |
| JP | 05-002163 | 8/1993 |
| JP | 07-318950 | 8/1995 |

OTHER PUBLICATIONS

European Search Report dated Jan. 29, 1998.

\* cited by examiner

*Primary Examiner*—Kenneth Parker
(74) *Attorney, Agent, or Firm*—Morrison & Foerster LLP

(57) ABSTRACT

A liquid crystal diaplay apparatus having a color filter base plate with a transparent substrate, a resin black matrix formed by dispersing a light-shielding agent therein and a colored film of three primary colors provided on the transparent substrate, an electrode-carrying base plate provided with electrodes for applying an electric field parallel to the color filter, a liquid crystal disposed between said color filter base plate and said electrode-carrying base plate, a first alignment layer on the protective layer, an overcoat film on the colored film, a second alignment layer on the overcoat film, and a spacer formed on the resin black matrix by patterning a resin is disclosed.

15 Claims, 2 Drawing Sheets

COLOR LIQUID CRYSTAL DISPLAY APPARATUS FOR PRODUCING A DISPLAY HAVING A HIGH CONTRAST AND A WIDE VISUAL FIELD ANGLE

BACKGROUND OF THE INVENTION

1. Field of the Invention

The present invention relates to a liquid crystal display apparatus driven by electric fields parallel to a base plate and a color filter for use in the liquid crystal display apparatus.

2. Description of the Related Art

As described in some detail later with reference to FIG. 2, conventional color liquid crystal display apparatuses of, for example, twisted nematic TN (twisted nematic) mode and IPS (in-plain switching) mode (lateral electric field method) normally employ glass fibers or plastic beads as a spacer between a color filter-side base plate and an electrode base plate provided with thin film transistors (TFTs) and a plurality of scan electrodes, in order to maintain the thickness of the liquid crystal layer (cell gap). The spacer such as a plurality of plastic beads is provided by spraying, so that the arrangement of individual spacer elements is uncontrollable, thereby causing problems of deterioration of the display quality of a liquid crystal display device due to light scattering by the spacer elements present on pixels.

Liquid crystal display devices employing sprayed spacer elements, such as plastic beads, also have the following further drawbacks. Since the spacer elements have spherical or rod-like shapes, the spacer elements form point-like or line or like contacts during the pressing of an assembly of base plates into a cell and, therefore, may well break an alignment layer or a transparent electrode in the device, possibly resulting in a display defect. Breakage of an alignment layer or a transparent electrode will also contaminate the liquid crystal and result in a voltage decrease.

Furthermore, a step of uniformly spraying spacer elements is required, or high-precision control of particle size distribution of the spacer elements is required. Thus, it is difficult to provide a liquid crystal display device having a stable display quality by a simple method.

Particularly in IPS mode liquid crystal display apparatuses, there is a need to maintain a cell gap with an increased consistency, thereby requiring an increased number of spacer spraying steps. The IPS mode liquid crystal display apparatuses also suffer more remarkably from the aforementioned problems in that for example, due to its material, the alignment layer may be fragile and conspicuous light scatter by the spacer may occur due to the increased back light intensity.

To solve these problems, JP-A- 63-82405, JP-A-04-93924, and JP-A-07-318950 propose a spacer structure wherein two or three colored layers are laminated. However, in TN-type liquid crystal display apparatuses, in order to prevent a short circuit between transparent electrodes in a portion where the spacer contacts a counter base plate and electrodes in the counter base plate, there is a need to form an insulating film in an upper portion of the counter base plate or the spacer or a need to restrict the position where the spacer is formed or the size of the spacer, thereby making production of a liquid crystal display apparatus difficult.

SUMMARY OF THE INVENTION

Accordingly, the present invention seeks to provide a color liquid crystal display apparatus that is easy to produce and excellent in display quality with a high contrast and a wide visual field angle.

Thus, the present invention provides a liquid crystal display apparatus comprising:

a color filter base plate having a transparent substrate, a black matrix and a colored film of three primary colors provided on the transparent substrate, an electrode-carrying base plate provided with electrodes for applying an electric field parallel to the color filter, and a liquid crystal disposed therebetween, wherein a spacer is formed on the black matrix by patterning a resin.

BRIEF DESCRIPTION OF THE DRAWINGS

Preferred embodiment of the present invention will be described in detail hereinafter with reference to the accompanying drawings, in which.

Figure 2:
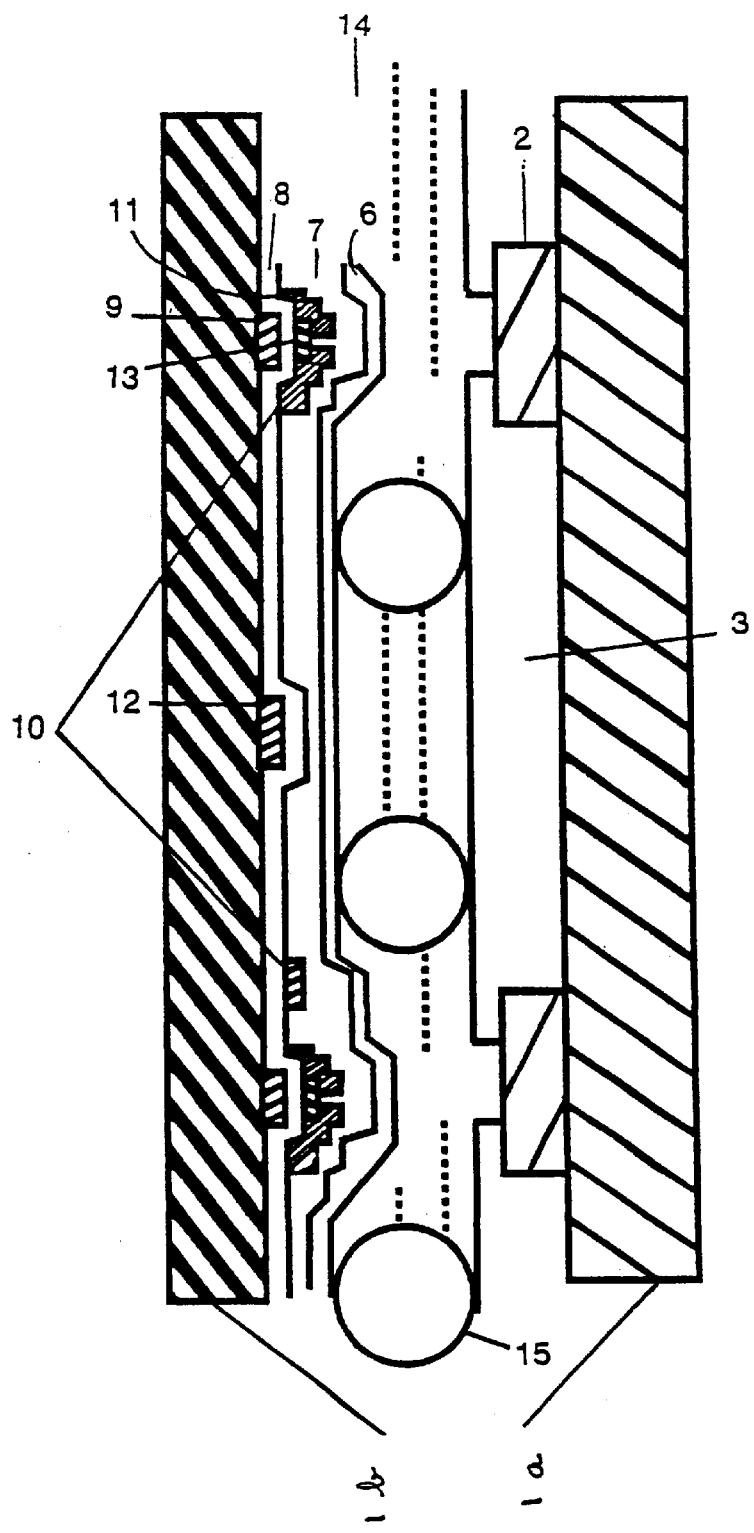
FIG. 2 is a sectional view of a conventional color liquid crystal display apparatus.

Referring firstly to FIG. 2, a known color filter for use in a liquid crystal display apparatus comprises a transparent substrate 12 carrying, on its upper surface, a black matrix 2 and a color pixel 3. Disposed above and spaced from the transparent substrate 12 is an upper substrate 12, from a lower surface of which project gate electrodes 9 and a common electrode 12. An insulating film 8 covers and is profiled to be in face to face contact with the downwardly facing surface and gate and common electrodes 9 and 12.

Each of a drain electrode 10, source electrode 11 and thin film transistor 13 depend downwardly from the insulating film 8. This arrangement of electrodes 9–12 is designed to apply an electrode field paralled to the color filter. A profiled protective film 7 covers and lies in face to face contact with the insulating film 8 and drain and source electrode 10 and 11. The protective film 7 is in turn covered by an alignment layer 6. A gap therefore exists between upwardly facing black matrix 2 on transparent substrate 12 and downwardly facing alignment layer 6 on upper substrate 12. In this gap sits a liquid crystal 14. In this known color filter, the gap is maintained by a plurality of beads 15.

Figure 1:
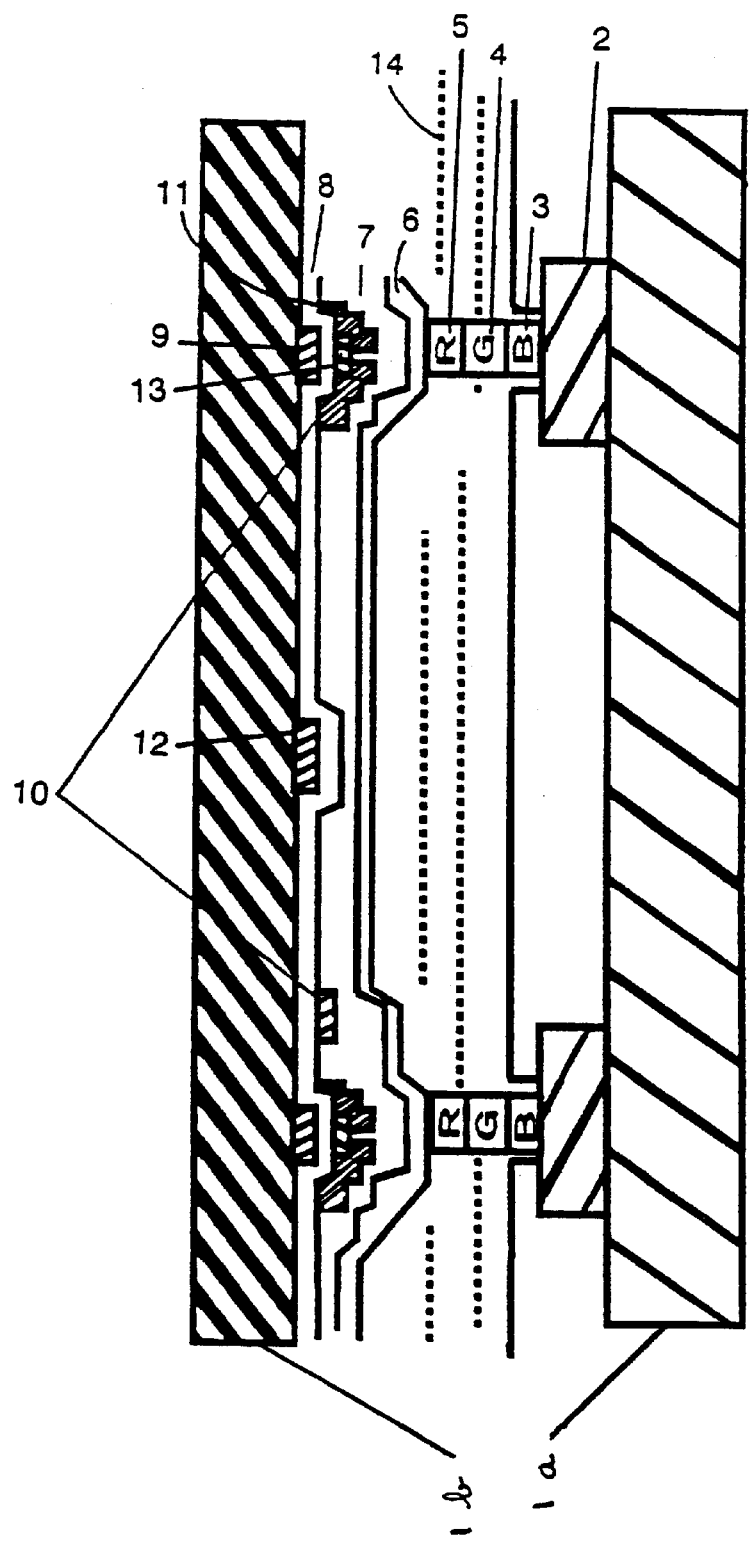
FIG. 1 is a schematic sectional view of a color liquid crystal display apparatus according to an embodiment of the present invention; and, for comparison

Referring now to FIG. 1, a liquid crystal display apparatus embodying the invention has all of the components described above with reference to FIG. 2, except that the gap in which sits the liquid crystal 14 is maintained not by beads 15, but by respective color layers 3, 4 and 5, being respective blue, green and red layers stacked one above the other.

DETAILED DESCRIPTION OF THE PREFERRED EMBODIMENTS

More particularly, the color filter used in the present invention has a transparent substrate, and a black matrix formed by patterning a light-shielding material. Openings in the black matrix are covered with pixels formed by colored layers provided in desired patterns separately for each color employed. The number and types of colors to be employed may be chosen at will. Spacer elements are formed on the black matrix by patterning a resin. The color filter may further have an overcoat layer that is formed on the colored layers if necessary. The color filter is used in a color liquid crystal display apparatus driven by electric fields parallel to the transparent base plate (lateral electric fields). This type of color liquid crystal display apparatus does not require a common electrode provided on the side of the color filter base plate, unlike a normal TN mode color liquid crystal display apparatus. Therefore, even though the spacer formed on the color filter base plate contacts the counter base plate, there is no short circuit between the common electrode and pixel electrodes or wiring on the counter base plate. The restrictions on the size of the spacer are therefore reduced. Further, the need to provide an insulating film on the side of the counter base plate is eliminated. Thereby, production of the liquid crystal display apparatus is facilitated because the number of man hours is reduced and the processing precision is improved. Furthermore, for the lateral electric field liquid crystal display apparatuses, which require control of a cell gap between the base plates with an increased precision, the color filter having a spacer formed by patterning is especially suitable because spacer elements having consistent heights and sizes can be uniformly arranged in the base plate, thereby making it possible to provide a uniform cell gap. The resin layer forming the spacer may be a single layer, or a plurality of laminated layers if a single layer fails to provide a sufficient height.

The resin layer forming the spacer according to the present invention is preferably formed of a material capable of bearing loads during production of a liquid crystal panel. Preferable examples of such a material are photosensitive or non-photosensitive materials such as polyimide-based resin, epoxy-based resin, acrylic resin, urethane-based resin, polyester-based resin and polyolefin-based resin.

There are several types of photosensitive resin, for example, photodegradable resin, photo crosslinking resin and photopolymerizing resin. Particularly preferred in a color filter embodying the present invention are, for example, photosensitive compositions such as photosensitive polyamic acid compositions, containing monomers, oligomers or polymers having ethylene unsaturated bonds and an initiator that generates radicals in respective to ultraviolet rays.

As for the non-photosensitive resin, resins enabling image or pattern development are preferably used. The non-photosensitive resin used in the present invention preferably has resistance to heat applied during the process for producing the liquid crystal display apparatus and also preferably has resistance to any organic solvent used during the process for producing the liquid crystal display apparatus. Polyimide-based resin is more preferably used, due to its high resistance to heat and organic solvents and its excellent mechanical properties for use as a spacer.

The polyimide resin used to prepare a spacer in a liquid crystal display apparatus embodying the present invention may be a resin obtained by applying to a substrate solution of a polyimide precursor and subjecting it to heat treatment, whereby a polymer (polyimide, polyamideimide) having imide rings or other cyclic structures is produced. The polyimide precursor may be a poly (amic acid) containing a structure unit (I) as a main component (ie no other structure unit is present in a greater molar proportion), which structure unit (I) has the formula

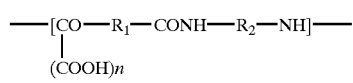

(1)

The polyimide-based resin may have bonds other than imide bonds, such as amide bonds, sulfone bonds, ether bonds and carbonyl bonds, without causing any significant drawback.

In the general formula (1), n is 1–2, and $R_1$ is a trivalent or tetravalent organic group having at least two carbon atoms. For improved heat resistance, $R_1$ is preferably a trivalent or tetravalent group having a cyclic hydrocarbon, an aromatic ring or an aromatic heterocyclic ring in which the number of carbon atoms is 6 to 30. Examples of $R_1$ are a phenyl group, biphenyl group, terphenyl group, naphthalene group, perylene group, diphenyl ether group, diphenyl sulfone group, diphenyl propane group, benzophenone group, biphenyl trifluoropropane group, cyclobutyl group and a cyclopentyl group. However, $R_1$ is not limited to these groups. $R_2$ is a bivalent organic group having at least two carbon atoms. For improved heat resistance, $R_2$ is preferably a bivalent group having a cyclic hydrocarbon, an aromatic ring or an aromatic heterocyclic ring in which the number of carbon atoms is 6 to 30. Examples of $R_2$ may be a phenyl group, biphenyl group, terphenyl group, naphthalene group, perylene group, diphenyl ether group, diphenyl sulfone group, diphenyl propane group, benzophenone group, biphenyl trifluoropropane group, diphenyl methane group and a cyclohexyl methane group. However, $R_2$ is not limited to these groups. In the polymer containing as a main component the structure unit represented by general formula (1), each of $R_1$ and $R_2$ may be formed by one of these groups or may be a copolymer formed by two or more of these groups. In order to increase the adhesion to a substrate, it is possible to copolymerize with, for example, bis-(3-aminopropyl) tetramethyl disiloxane having a siloxane structure, as a diamine component in an amount within a range that will not reduce the heat resistance. It is also possible to add, as an amino terminal sealer, an anhydride such as maleic anhydride, in an amount in accordance with the concentration of terminals after polymerization of a polyimide precursor, and allow it to react.

The mechanical properties of the polyimide film become better with increasing molecular weight. Therefore, it is desirable that a polyimide precursor have a large molecular weight. However, if a polyimide precursor is subjected to wet etching for patterning, an excessively large molecular weight of the polyimide precursor results in an inconveniently long development time. Therefore, it is normally preferred that the degree of polymerization be within a range of 5 to 1000.

The resin that forms the spacer may contain a coloring agent if necessary. As a coloring agent, an organic pigment, an inorganic pigment or a dye may be used. It is further possible to add various additives, such as an ultraviolet absorbing agent or a dispersion agent, a leveling agent. If the spacer needs to have a light-shielding characteristic, it is possible to use a light shielding agent, such as carbon black, powder of a metal oxide such as titanium oxide or iron tetroxide, metal sulfide powder, metal powder, and further a mixture of pigments of, for example, red, blue and green color. Among these, carbon black has an excellent light shielding characteristic and therefore is particularly preferred. If the spacer needs to have an insulating characteristic as well as a light shielding characteristic, it is possible to use carbon black whose surfaces are coated with fine particles of an insulating inorganic compound such as titanium oxide or iron oxide.

In a liquid crystal display apparatus embodying the present invention, it is preferable that the spacer be formed in non-display areas inside and outside the display screen area. In this manner, the interval between the two base plates of the liquid crystal display device can be more consistently maintained within the display apparatus screen.

The spacer, formed by patterning the resin layer according to the present invention, is preferably formed by laminating a colored layer that covers the open portions of the matrix, more preferably, by laminating layers of three primary colors. By forming the spacer by laminating a colored layer, the spacer can be formed simultaneously with production of a color filter without increasing the number of processing steps. Furthermore, by lamination of three primary color layers, it becomes easy to provide a sufficient cell gap without increasing the film thickness of each colored layer. If lamination of three primary color layers does not provide a sufficient height, an additional resin layer may be laminated.

A liquid crystal display apparatus according to the present invention has light shielding areas arranged between individual pixels, called a "black matrix". With the black matrix provided, the color filter improves the contrast of the liquid crystal display apparatus.

As a black matrix, thin metal films (having a thickness of about 0.1–0.2 $\mu$m) of, eg Cr, Al or Ni or resin black matrixes wherein a light shielding agent is dispersed in a resin are normally employed. In the present invention, it is more preferable to use a resin black matrix formed by dispersing a black pigment in a polyimide film. This is because such a resin black matrix has a low reflectivity and a good heat resistance and a good solvent resistance and, moreover, has a low relative dielectric constant so that it causes less disturbance to the lateral electric fields. Furthermore, it is possible to provide the resin black matrix with a capacity for orienting liquid crystal by rubbing as performed on the pixels.

Furthermore, resin black matrixes are easy to increase in thickness compared with metal thin films, so that it is easier to form a spacer that provides a sufficient cell gap by forming a spacer on a resin black matrix.

Examples of the light shielding agent usable in the black matrix are carbon black and a powder of a metal oxide such as titanium oxide or iron tetroxide, metal sulfide powder, metal powder, and also a mixture of pigments of, for example, red, blue or green color. Among these, carbon black has an excellent light shielding characteristic and therefore is particularly preferred. Since carbon black having small particle diameters and therefore good dispersibility normally exhibits a brownish color tone, it is preferred to mix such carbon black with a pigment of complementary color to render it black.

If the black matrix is formed of a polyimide resin, it is normally preferred to use, as a black paste solvent, an amide-family polar solvent such as N-methyl-2-pyrrolidone, N,N-dimehtylacetoamide or N,N-dimethylformamide or a lactone-family polar solvent such as γ-butylolactone.

The method for dispersing carbon black or a light shielding agent such as a pigment of complementary color to the carbon black may be, for example, a method wherein after a light shielding agent and, for example, a dispersing agent are mixed into a polyamide precursor solvent, they are dispersed in a dispersing machine such as a three-roll machine, a sand grinder or a ball mill. It is also possible to add various additives for providing improvements in the dispersion, application characteristic and leveling characteristic of the carbon black.

The resin black matrix may be produced by applying a black paste on the transparent substrate, drying the paste and then patterning. The black paste may preferably be applied by, for example, a dip method, a roll coater method, a spinner method, a die coating method or a method using a wire bar. After being applied, the paste may be heated and dried (semi-cured) using an oven or a hot plate. The semi-cure conditions vary depending on the resin and solvent used, and the amount of paste applied. It is normally preferred to heat the paste at 60–200° C. for 1–60 minutes.

If the resin of the black paste coating thus formed is a non-photosensitive resin, a positive photoresist coating is formed thereon before exposure and development. If the resin is a photosensitive resin, the black paste coating is exposed and developed immediately or after an oxygen blocking film is formed. Then, after the positive photoresist or the oxygen blocking film (if necessary) is removed, the developed coating is subjected to heating and drying (main cure). In a case where a polyimide-based resin is obtained from a precursor, the main cure conditions slightly vary depending on the amount of paste applied. Normally, the coating is heated at 200–300° C. for 1–60 minutes. Through these processes, a black matrix is formed on a substrate.

It is also possible to form a resin black matrix by a so-called transfer method. In this method, a transfer film wherein a black layer provided with a photosensitive component is formed on a base is prepared beforehand, and the film is laid on a substrate (heated and pressurized if necessary) for exposure and development. After that, the base is peeled leaving a resin black matrix formed on the substrate.

The film thickness of the resin black matrix is preferably 0.5–2.0 $\mu$m and, more preferably, 0.8–1.5 $\mu$m. If the film thickness of the resin black matrix is less than 0.5 $\mu$m, it becomes difficult to reliably provide a sufficient cell gap and, further, the light shielding characteristic becomes insufficient. If the film thickness is greater than 2.0 $\mu$m, it becomes likely that the flatness of the liquid crystal display apparatus will be sacrificed, resulting in a stepped or irregular surface, although a sufficient cell gap may be reliably provided.

The light shielding characteristic of the resin black matrix may be represented by an OD value (common logarithm of the inverse of transmittance). To improve display quality of the liquid crystal display apparatus, the OD value is preferably 2.5 or higher and, more preferably, 3.0 or higher. The upper limit of the OD value should be determined based on the relationship with the aforementioned preferable range of the film thickness of the resin black matrix.

The reflectivity of the resin black matrix is preferably 2% or lower in terms of the reflectivity (Y value) corrected by a visibility factor within a visual light range of 400–700 nm and, more preferably, 1% or lower.

Each opening in the black matrix is normally 20–200 $\mu$m×20–300 $\mu$m. The colored layer is formed such that such open portions in the black matrix are covered.

The colored layer in a liquid crystal display apparatus embodying the present invention is a layer formed by a film having a capacity for transmitting any selected color of light. The colored layer may be formed of any material. Normally, a liquid crystal display apparatus according to the present invention includes at least three layers of three primary colors, that is, red (R), green (G) and blue (B), or cyan (C), magenta (M) and yellow (Y), and each pixel is provided with one of the three colored layers. Examples of specific materials for the colored layer are a polyimide film wherein a coloring agent, a pigment or a dye is dispersed, a PVA (polyvinyl alcohol) treated with staining or a $SiO_2$ film whose thickness has been controlled so that only selected light is transmitted. A polyimide film wherein a pigment is dispersed is more preferable because the polyimide film makes it possible to form a colored layer through a process comparable with or easier than the processes required for other materials and, moreover, the polyimide film is better in heat resistance, light resistance and chemical resistance. Furthermore, employment of the polyimide film is preferred for improved mechanical properties in a case where the colored layer is used as a spacer.

The relative dielectric constant of the colored layer according to the present invention is preferably less than 4.5 and, more preferably, 3.6 or less. To effectively apply electric fields to the liquid crystal in a direction parallel to the base plate, it is desirable that the relative dielectric constant of the color filter-constituting materials be less than either the shorter axis component or the longer axis component of the relative dielectric constant of the liquid crystal, more preferably, ½ or less. This is because with an increase in the relative dielectric constant of the color filter-constituting materials, the deviation of the direction of an electric field from the direction parallel to the base plate at the interface between the liquid crystal and the color filter increases, so that the effective electric field decreases and, therefore, the liquid crystal switching efficiency decreases. For a color filter without an overcoat, the colored layer is preferably formed of a material having a reduced relative dielectric constant because then the colored layer contacts the liquid crystal directly or with an alignment layer provided therebetween. For a color filter having an overcoat, it is also preferred that the colored layer be formed of a material having a reduced relative dielectric constant so as to achieve a reduction of the relative dielectric constant of the entire color filter.

The maximum component of the relative dielectric constant of the liquid crystal used in liquid crystal display apparatuses driven by thin film transistors is normally about 8–12 or at least 4.5. Therefore, the relative dielectric constant of the colored layer is preferably less than 4.5 and, more preferably, 3.6 or less. The relative dielectric constant herein refers to values measured at 20° C. within a frequency of 100 Hz–100 kHz.

The colored layer according to the present invention is more preferably a film provided with a capacity for orienting liquid crystal molecules in contact therewith by an orientation method such as rubbing, hereinafter referred to as an "alignment layer". Thereby, it becomes possible to omit a step of separately applying an alignment layer on a color filter during production of a liquid crystal display panel.

It is desirable that the colored layer according to the present invention have a surface that is smooth as much as possible. More specifically, the colored layer surface desirably has an Ra value of 0.010 μm or lower, the Ra value being a measured value indicating a surface roughness. This level of surface roughness will prevent occurrence of an orientation failure during rubbing and therefore prevent a display failure caused by an orientation failure.

Pigments used in the present invention are not particularly limited. Preferred are pigments excellent in light resistance, heat resistance and chemical resistance. Specific examples of representative pigments are cited below with reference to their Color Index (CI) numbers. Examples of yellow pigments are CI Pigment Yellow 20, 24, 83, 86, 93, 94, 109, 110, 117, 125, 137, 138, 139, 147, 148, 153, 154, 166 and 173. Examples of orange pigments are CI Pigment Orange 13, 31, 36, 38, 40, 42, 43, 51, 55, 59, 61, 64 and 65. Examples of red pigments are CI Pigment Red 9, 97, 122, 123, 144, 149, 166, 168, 177, 180, 192, 215, 216 and 224. Examples of purple pigments are CI Pigment Violet 19, 23, 29, 32, 33, 36, 37 and 38. Examples of blue pigments are CI Pigment Blue 15 (eg. 15:3, 15:4 and 15:6), 21, 22, 60 and 64. Examples of green pigments are CI Pigment Green 7, 10, 36 and 47. An example of a black pigment is CI Pigment Black 7. It is also possible to use pigments subjected to surface treatment such as rosin treatment, acidic group treatment and basic group treatment if desired.

A colored layer may be formed by applying to a substrate on which a black matrix has been formed, and then drying and patterning. The method for dispersing or dissolving a coloring agent such as a pigment may be, for example, a method wherein after a resin and a coloring agent are mixed into a solvent, the resin and coloring agent are dispersed in a dispersing machine such as a three-roll machine, a sand grinder or a ball mill.

The colored paste is preferably applied, as in application of a black paste, for example, by a dip method, a roll coater method, a spinner method, a die coating method or a method using a wire bar. After being applied, the paste may be heated and dried (semi-cured) using an oven or a hot plate. The semi-cure conditions vary depending on the resin and solvent used, and the amount of paste applied. It is normally preferred to heat the paste at 60–200° C. for 1–60 minutes.

If the resin of the colored paste coating thus formed is a non-photosensitive resin, a positive photoresist coating is formed thereon before exposure and development. If the resin is a photosensitive resin, the colored paste coating is exposed and developed immediately or after an oxygen blocking film is formed. Then, after the positive photoresist or the oxygen blocking film (if necessary) is removed, the developed coating is subjected to heating and drying (main cure). The main cure conditions vary depending on the resin. However, in a case where a polyimide-based resin is obtained from a precursor, the coating is normally heated at 200–300° C. for 1–60 minutes. Through these processes, a patterned colored layer is formed on the substrate carrying the black matrix formed thereon.

After a first color layer is formed over the entire surface of the substrate carrying the black matrix, unnecessary portions may be removed by photolithography, thereby forming a desired pattern of the first color layer. The second and third color layers may be formed by similar procedures into desired color layer patterns.

In the color filter of the present invention, it is possible to provide an overcoat film on the colored layer if desired. The overcoat film herein is a film formed for protection of the colored layers or the flattening of the color filter surface. In an IPS mode liquid crystal display apparatus, the overcoat film will achieve an advantage of shielding an electrically conductive material, such as a metal black matrix, so as to effectively apply lateral electric fields to the liquid crystal. As in the colored layers, the overcoat film is more preferably a film provided with a capacity for orienting liquid crystal molecules in contact therewith by an orientation method such as rubbing. Thereby, it becomes possible to produce a liquid crystal display apparatus without a need to separately form an alignment layer on the color filter, thereby reducing the number of production processes. Further, in the color filter of the present invention, the overcoat film will be effective in improving the physical properties of the spacer. Moreover, it will become possible to adjust the height of the spacer by rendering the overcoat film thickness over the display area less than the overcoat film thickness over the spacer.

Specific examples of the overcoat film may be inorganic films of, for example, $SiO_2$, and organic films such as epoxy films, acrylic epoxy films, acrylic films, siloxane polymer films, polyimide films, silicon-containing polyimide films and polyimide siloxane films. Preferred are polyimide-based high molecular weight films, such as polyimide films, silicon-containing polyimide films and polyimide siloxane films, due to their excellent flatness, applicability and heat resistance and, furthermore, their superiority over the other films in their capacity for restricting the orientation of the liquid crystal.

The polyimide siloxane film according to the present invention may be a film produced by heat-treating a polyimide siloxane precursor coating. The polyimide siloxane precursor coating can be produced by various procedures. In a representative procedure, a silicon compound having in its molecule at least one primary amino group or at least one secondary or higher alkoxide group is reacted with a tetracarboxylic dianhydride in an organic solvent, thereby producing a precursor coating. The reaction product may further be hydrolyzed and condensed to produce a precursor coating.

The overcoat film in a color filter embodying the present invention preferably has a surface that is smooth as much as possible. More specifically, the overcoat film surface desirably has an Ra value of 0.01 μm or lower, the Ra value being a measured value indicating a surface roughness. This level of surface roughness will prevent occurrence of an orientation failure during rubbing and therefore prevent a display failure caused by an orientation failure.

The relative dielectric constant of the overcoat film in the present invention is preferably less than 4.5 and, more preferably, 3.6 or less, for the same reason as stated above in conjunction with the colored layer. In particular, it is preferred that the overcoat film that contacts with liquid crystal directly or with an alignment layer provided therebetween be formed by a material having a further reduced relative dielectric constant. The relative dielectric constant herein refers to a value measured at 20° C. with a frequency of 100 Hz–100 kHz.

The overcoat may preferably be applied, as in application of a black paste, by, for example, a dip method, a roll coater method, a spinner method, a die coating method or a method using a wire bar. After application, heating and drying (semi-cure) may be performed using an oven or a hot plate. The semi-cure conditions vary depending on the resin and solvent used, and the amount applied. It is normally preferred to heat it at 60–200° C. for 1–60 minutes.

The thus-formed overcoat film may then heated and dried (main-cured). The main cure conditions vary depending on the resin. If a polyimide-based resin is obtained from a precursor, the overcoat film is normally heated at 200–300° C. for 1–60 minutes. Through these processes, the overcoat film is formed.

The orientation treatment in the present invention may be performed by any method as long as the method provides the colored layers or the overcoat film with capacity for orienting liquid crystal in contact therewith. Specific examples of such method are a rubbing method, an oblique vapor deposition method and a grating method. Among these, a rubbing method is more preferably used because the method can be performed by a relatively simple apparatus so as to provide a high productivity on an industrial scale, and can provide a high orientating capacity.

The rubbing method used in preparing a color filter embodying the present invention is a method wherein a cloth (for example) is rubbed in a single direction against a film, that is, the object of orientation treatment. The liquid crystal molecules that contact with the rub-treated film are oriented in the rubbing direction. The material to be rubbed against the film varies depending on the hardness of the film to be treated. For a polyimide film, a cotton cloth or a rayon cloth having a staple length of 2–3 mm is normally used.

The color filter of the present invention preferably has an electrically conductive transparent film provided on the reverse face of a base plate. The reverse face of the base plate is that face opposite from the face that contacts with the liquid crystal when a liquid crystal display apparatus is assembled. With the electrically conductive transparent film provided on the reverse face of the base plate, the charging of the base plate can be prevented. Charges in the base plate can cause deficiencies or problems such as a defective conveyance of the base plate during production processing steps, deposition of contaminants due to static electricity and breakage of thin film transistors in the counter base plate. Furthermore, an electric field caused by static electricity may disturb the orientation of the liquid crystal inside the cell and thereby cause a display defect. Examples of the electrically conductive transparent film employed in the present invention are an electrically conductive transparent film formed mainly from a metal or a metal oxide, or an electrically conductive transparent film formed mainly from an alloy of a combination of several kinds of metals and metal oxides.

Specific examples of a main component of the electrically conductive transparent film are metals and metal oxides such as Al, Mo, Cr, Ta, Cu, W, Ti, Au, Te, TeSe, In, Ge, Tb, Dy, Gd, ZnS, TbFe, DyFe, Gd, $SiO_2$, SiO, SiC, $SI_5N_4$, AlN, ITO, $In_2O_3$, $SnO_2$, ZnO, ZnS, CaS, SrS, $Ta_2O_5$, $WO_3$, $Y_2O_3$, $SrTiO_3$, $BaTiO_3$, $PbTiO_3$, $Al_2O_3$, NiCr, $TaSiO_2$ and $TiCSiO_3$. Practically, alloys of combinations of several species of these metals and metal oxides may be used. Among these, ITO is preferably used because it does not sacrifice the transparency and is excellent in electric conductivity.

The specific resistance of the electrically conductive transparent film is normally 2 kΩ·cm or less and, preferably, 600 Ω·cm and, more preferably, 300 Ω·cm. If the specific resistance of the electrically conductive transparent film is excessively great, a sufficient charge preventing effect may not be achieved.

The transmittance of the electrically conductive transparent film according to the present invention is preferably 96% or higher and, more preferably, 98% or higher. If the transmittance of the electrically conductive transparent film is lower, the transmittance of the color filter may become inconveniently low and the contrast also decreases to an undesirable level.

The thickness of the electrically conductive transparent film in a color filter embodying the present invention is preferably 10 nm to 100 nm and, more preferably, 20 nm to 50 nm. If the thickness of the electrically conductive transparent film is excessively small, a sufficient charge preventing effect may not be achieved. If the film thickness is excessively great, the transmittance may decrease to an undesired level.

An example of the method for forming a spacer through lamination of colored layers in a color filter according to the present invention will be described below.

After a first color layer is formed over the entire surface of the base plate carrying the resin black matrix formed thereon, unnecessary portions are removed by photolithography, thereby forming a desired pattern of the first color layer. Portions of the colored layer that cover openings in the resin black matrix and that form spacer elements through lamination of colored layers are left on the base plate. The second and third color layers are formed and left on the base plate by similar procedures, so that the openings in the resin black matrix are covered with one of the three colored layers and the three layers are left to provide spacer elements. The colored layers over the openings and the colored layers forming the spacer elements may be continuous or separate from each other.

The thickness of the three primary color layers is not particularly limited. However, the thickness of each layer is preferably 1–3 μm, so that the total thickness of the three layers amounts to 3–9 μm. If the total film thickness is less than 3 μm, a sufficiently large cell gap may not be obtained. If the total film thickness exceeds 9 μm, it may become difficult to uniformly apply the colored layers.

If the color filter of the present invention is used to maintain a cell gap in a case, for example, where R, G and B are selected as the three colors, the cell gap for R in the liquid crystal display apparatus corresponds to the film thickness of G+B+Bk (resin black matrix), and the cell gap for G corresponds to the film thickness of B+R+Bk, and the cell gap for B corresponds to a film thickness of R+G+Bk. If the dispersibility of the coloring agents in the pastes for forming the colored layers is improved or if the leveling characteristic is improved for the purpose of uniform application, the height of the spacer formed by lamination of the three primary color layers becomes less than the total film thickness of the three color layers over pixels. That is, the cell gap for R becomes less than the total thickness of G+B+Bk, and, likewise, the cell gap for G becomes less than the total thickness of B+R+Bk, and the cell gap for B becomes less than the total thickness of R+B+Bk.

The spacer formed by lamination of the three primary color layers according to the present invention is formed on the resin black matrix as described above. The areas and locations of spacer elements on the black matrix are strongly dependent on the structure of the active matrix base plate that faces the color filter when a liquid crystal display device is produced. If no such restriction is imposed by the counter electrode base plate, the areas and locations of the spacer elements are not particularly limited. However, considering the pixel size, the area of each spacer element is preferably 10 μm² to 1000 μm². If the area of each spacer element is less than 10 μm², it may become difficult to form a minute and precise pattern and laminate. If it is greater than 1000 μm², it may become difficult to arrange the spacer elements precisely on the black matrix, depending on the configuration of the spacer elements.

The liquid crystal display apparatus of the present invention has an excellent feature namely that of a wide view field angle, because it is driven by lateral electric fields. Moreover, since no spacer exists in the pixels, deterioration of the display quality caused by light leakage through the spacer or light scatter thereby are eliminated. Furthermore, since the liquid crystal display apparatus has fixed spacer elements that are formed and regularly arranged by patterning the resin layers, the cell gap becomes uniform, thereby improving the display quality. Thus, the present invention makes it easy to provide a TFT liquid crystal display apparatus with a wide view field angle and an improved display quality. Further, since thin film transistors (TFTs) are provided in the electrode-carrying base plate, it becomes possible to produce a TFT liquid crystal display apparatus further improved in display quality.

EXAMPLE 1

Production of Black Matrix 3,3',4,4'-Biphenyl tetracarboxylic dianhydride, 4,4'-diaminodiphenyl ether and bis(3-aminopropyl)tetramethyl disiloxane were reacted in a solvent of N-methyl-2-pyrrolidone, thereby obtaining a polyimide precursor (polyamic acid) solution.

A carbon black mill base having the following composition was dispersed at 7000 rpm for 30 minutes using a homogenizer. Glass beads were filtered out, thereby preparing a black paste.

| <Carbon mill base> | |
|---|---|
| Carbon black (MA100 by Mitsubishi Kasei Kabushiki Gaisha) | 4.6 parts |
| Polyimide precursor solution | 24.0 parts |
| N-methyl pyrrolidone | 61.4 parts |
| Glass beads | 90.0 parts |

The black paste was applied to a no-alkali glass (OA-2 by Nippon Denki Glass Kabushiki Gaisha) substrate having a size of 300×350 mm using a spinner. The applied paste was semi-cured at 135° C. in an oven for 20 minutes. A positive resist (Shipley "Microposit" RC100 30 cp) was then applied using a spinner, after which the resist was dried at 90° C. for 10 minutes. The resist film thickness was 1.5 μm. The positive resist was then exposed through a photomask using an exposure apparatus PLA-501F by Canon Kabushiki Gaisha.

The substrate was dipped in a developer aqueous solution at 23° C. The aqueous solution contained 2% by weight of tetramethylammonium hydroxide. The substrate was oscillated in such a manner that the substrate reciprocated over a distance of 10 cm once in every five seconds, thereby simultaneously performing development of the positive resist and the etching of the polyimide precursor. The development time was 60 seconds. After that, the positive resist was peeled using methyl cellosolve acetate. The substrate was then cured at 300° C. for 30 minutes, thereby obtaining a resin black matrix. A spacer pattern was simultaneously formed outside the screen area. The film thickness of the resin black matrix was 0.90 μm, and the OD value thereof was 3.0. The reflectivity (Y value) at the interface between the resin black matrix and the glass substrate was 1.2%.

Production of Colored Layers

As red, green and blue pigments, a dianthraquinone-based pigment indicated by Color Index No. 65300 Pigment Red 177, a phthalocyanine green-based pigment indicated by Color Index No. 74265 Pigment Green 36, and a phthalocyanine blue-based pigment indicated by Color Index No. 74160 Pigment Blue 15–4 were prepared. These pigments were separately mixed and dispersed in the polyimide precursor solution, thereby obtaining three colored pastes of red, green and blue.

The blue paste was first applied to the resin black matrix substrate, and dried by hot air at 80° C. for 10 minutes, and then semi-cured at 120° C. for 20 minutes. After that, a positive resist (Shipley "Microposit" RC100 30 cp) was applied using a spinner, and then dried at 80° C. for 20 minutes. The positive resist was exposed through a mask and the substrate was then dipped in an alkaline developer (Shipley "Microposit" 351). The substrate was oscillated in the developer, thereby simultaneously performing development of the positive resist and the etching of the polyimide precursor. After that, the positive resist was peeled using methyl cellosolve acetate. The substrate was then cured at 300° C. for 30 minutes. The film thickness in the colored pixel portion was 2.3 μm. Through patterning, blue pixels were formed and, simultaneously, the first layer of the spacer over the resin black matrix was formed. The size of the spacer elements was 20 μm×20 μm.

After the substrate was washed with water, the green paste was applied to form green pixels and the second layer of the spacer on the resin black matrix in a manner as described above. The film thickness in the green pixel portion was 2.3 μm. The size of the spacer elements was 20 μm×20 μm.

After the substrate was washed with water, the red paste was applied to form red pixels and the third layer of the spacer on the resin black matrix in a manner as described above. A color filter was thus produced. The film thickness in the red pixel portion was 2.3 μm. The mask size of the spacer elements was 14 μm×14 μm.

The area of each spacer element formed on the resin black matrix by lamination of the colored layer was about 200 μm². The height of the spacer (that is, the thickness of the three colored layers on the resin black matrix) was 5.6 μm, which is less than the total of the film thicknesses of the individual colored layers (that is, 6.9 μm). The spacer elements are provided inside the screen area at a rate of 1 piece per pixel. Spacer elements of a laminate of the colored layers are also formed on portions of the frame-like resin black matrix portion in the periphery of the screen area and on the spacer pattern formed by the black paste outside the screen area in such a manner that the contact area of these spacer elements with the counter base plate per unit area becomes equal to that of the spacer elements inside the screen area.

The surface roughness of each colored layer was measured by a surface roughness tester, providing an Ra value of 0.006 μm.

Measurement of Relative Dielectric Constant of Colored Layers

An aluminum film of 1000 Å was vapor-deposited on a separately prepared non-alkali glass substrate using a vacuum vapor deposition apparatus, to produce common electrodes.

The red, blue and green color pastes as used for production of the color filter were separately spin-coated on aluminum films. The pastes thus applied were then heated at 110° C. for 20 minutes and then at 290° C. for 40 minutes in a clean oven, thereby forming polyimide colored coatings having a film thickness of 1 μm.

A SUS mask having square holes of 1 cm×1 cm was laid over each colored layer film surface, and then subjected to aluminum vapor deposition, thereby forming counter electrodes.

After a portion of each colored layer was removed to form an electrode lead-out portion, lead wires were connected to the counter electrodes and the common electrodes using a silver paste.

The capacity between the common electrodes and the counter electrodes were measured within a frequency range of 100 Hz–100 kHz using an LCR meter. The polyimide film thickness and the counter electrode area were also measured. Based on these measurements, the relative dielectric constant was calculated. The relative dielectric constant in aforementioned frequency range was 4.3 or lower.

Production of Color Liquid Crystal Display Device

Direct rubbing was performed on the color filter. An electrode-carrying base plate equipped with thin film transistors (TFTs) was produced as described below.

First, gate and common electrodes were patterned on a non-alkali glass substrate by photoetching using chrome. Then, insulating films of silicon nitride (SiN) were formed to cover the electrodes. Amorphous silicon (a-Si) films were formed on the gate insulating films. On the amorphous silicon films, source and drain electrodes were formed using aluminum. The electrodes were patterned so that electric fields will occur between the common electrodes and the drain electrodes in directions parallel to the glass substrate. Protective films of SiN were formed on the electrodes. Then, a polyimide-based alignment layer was formed on the very top, and subjected to rubbing, thereby obtaining an electrode-carrying counter base plate equipped with TFTs.

The color filter was fixed to the electrode-carrying base plate equipped with TFTs, using a sealant. A liquid crystal was then injected through an injection opening formed in the seal, by leaving the empty cell under a reduced pressure, then dipping the injection opening into a liquid crystal tank, and then introducing a normal pressure. After injection of the liquid crystal, the injection opening was sealed. A polarizing plate was then fixed to the outside surface of the base plate, thereby producing a cell. The liquid crystal display device thus produced exhibited good display quality with a high contrast and no display irregularity.

EXAMPLE 2

Production of Color Filter

By substantially the same procedure as in Example 1, a resin black matrix and colored layers were sequentially patterned on a non-alkali glass substrate to produce a color filter provided with a spacer formed by lamination of the colored layers.

Production of Color Liquid Crystal Display Device

A polyimide-based alignment layer was formed on the colored layers of the color filter, and subjected to rubbing. An electrode-carrying base plate equipped with thin film transistors (TFTs) was produced by substantially the same procedure as in Example 1.

The color filter was fixed to the electrode-carrying base plate equipped with TFTs, using a sealant. A liquid crystal was then injected through an injection opening formed in the seal, by leaving the empty cell under a reduced pressure, then dipping the injection opening into a liquid crystal tank, and then introducing a normal pressure. After injection of the liquid crystal, the injection opening was sealed. A polarizing plate was then fixed to the outside surface of the base plate, thereby producing a cell. The liquid crystal display device thus produced exhibited good display quality as in Example 1.

EXAMPLE 3

Production of Color Filter

By substantially the same procedure as in Example 1, a resin black matrix and colored layers were sequentially patterned on a non-alkali glass substrate to produce a color filter provided with a spacer formed by lamination of the colored layers. The color filter was spin-coated with a solution of a hardening composition obtained by reacting hydrolysates of γ-aminopropyl-methyldiethoxysilane with 3,3',4,4'-benzophenone tetracarboxylic dianhydride. The coated color filter was heated at 280° C. for three hours, thereby forming an overcoat film having a film thickness of 1 μm.

The surface roughness of the overcoat film was measured by a surface roughness tester, providing a measurement of 0.006 μm. The overcoat film of the color filter was subjected to direct rubbing by a rubbing device.

Measurement of Relative Dielectric Constant of Overcoat Film

An aluminum film of 1000 Å was vapor-deposited on a non-alkali glass substrate using a vacuum vapor deposition apparatus, to produce common electrodes.

The aluminum film was spin-coated with the overcoat solution used to produce the color filter, and then heated at 280° C. for 3 hours, thereby forming an overcoat film having a film thickness of 1 μm. In a procedure substantially the same as in the measurement of the relative dielectric constant of the colored layers in Example 1, the relative dielectric constant of the overcoat film was measured, providing a relative dielectric constant of 3.5 or lower in a frequency range of 100 Hz–100 kHz.

Production of Color Liquid Crystal Display Device

The overcoat film of the color filter was subjected to direct rubbing. An electrode-carrying base plate equipped with thin film transistors (TFTs) was produced by substantially the same procedure as in Example 1.

The color filter was fixed to the electrode-carrying base plate equipped with TFTs, using a sealant. A liquid crystal was then injected through an injection opening formed in the seal, by leaving the empty cell under a reduced pressure, then dipping the injection opening into a liquid crystal tank, and then introducing a normal pressure. After injection of the liquid crystal, the injection opening was sealed. A polarizing plate was then fixed to the outside surface of the base plate, thereby producing a cell. The liquid crystal display device thus produced exhibited good display quality.

EXAMPLE 4

By substantially the same procedure as in Example 1, a resin black matrix and colored layers were sequentially patterned on a non-alkali glass substrate to produce a color filter provided with a spacer formed by lamination of the colored is layers. The color filter was spin-coated with a solution of a hardening composition obtained by reacting hydrolysates of y-aminopropyl-methyldiethoxysilane with 3,3',4,4'-benzophenone tetracarboxylic dianhydride. The coated color filter was heated at 280° C. for three hours, thereby forming an overcoat film having a film thickness of 1 μm.

Production of Color Liquid Crystal Display Device

A polyimide-based alignment layer was formed on the overcoat film of the color filter, and subjected to rubbing. An electrode-carrying base plate equipped with thin film transistors (TFTs) was produced by substantially the same procedure as in Example 1.

The color filter was fixed to the electrode-carrying base plate equipped with TFTs, using a sealant. A liquid crystal was then injected through an injection opening formed in the seal, by leaving the empty cell under a reduced pressure, then dipping the injection opening into a liquid crystal tank, and then introducing a normal pressure. After injection of the liquid crystal, the injection opening was sealed. A polarizing plate was then fixed to the outside surface of the base plate, thereby producing a cell. The liquid crystal display device thus produced exhibited good display quality.

EXAMPLE 5

Production of Color Filter

An ITO film was formed on a surface of a non-alkali glass substrate by sputtering. The ITO film had a film thickness of 15 nm, a specific resistance of 315 Ω·cm, and a transmittance of 99.6%. On a surface of the glass substrate opposite from the surface provided with the ITO film, a resin black matrix and colored layers were sequentially formed by substantially the same procedure as in Example 1, thereby producing a color filter provided with a spacer formed by lamination of the colored layers.

Production of Color Liquid Crystal Display Device

A polyimide-based alignment layer was formed on the colored layers of the color filter, and subjected to rubbing. An electrode-carrying base plate equipped with thin film transistors (TFTs) was produced by substantially the same procedure as in Example 1.

The color filter was fixed to the electrode-carrying base plate equipped with TFTs, using a sealant. A liquid crystal was then injected through an injection opening formed in the seal, by leaving the empty cell under a reduced pressure, then dipping the injection opening into a liquid crystal tank, and then introducing a normal pressure. After injection of the liquid crystal, the injection opening was sealed. A polarizing plate was then fixed to the outside surface of the base plate, thereby producing a cell. The liquid crystal display device thus produced exhibited good display quality. Further, no display defective due to effect of static electricity was observed.

COMPARATIVE EXAMPLE 1

Production of Color Filter

A color filter was produced by sequentially patterning a resin black matrix and colored layers on a non-alkali glass substrate in substantially the same manner as in Example 1, except that a spacer of a laminate of the colored layers was not formed. The color filter was spin-coated with a solution of a hardening composition obtained by reacting hydrolysates of γ-aminopropylmethyldiethoxysilane with 3,3',4,4'-benz ophenone tetracarboxylic dianhydride. The coated color filter was heated at 280° C. for three hours, thereby forming an overcoat film having a film thickness of 1 μm.

Production of Color Liquid Crystal Display Device

A polyimide-based alignment layer was formed on the overcoat film of the color filter, and then subjected to rubbing. An electrode-carrying base plate equipped with thin film transistors (TFTs) was produced by substantially the same procedure as in Example 1.

Plastic beads having a diameter of 5 μm were sprayed onto the color filter and the color filter was then fixed to the electrode-carrying base plate equipped with TFTs, using a sealant. A liquid crystal was then injected through an injection opening formed in the seal, by leaving the empty cell under a reduced pressure, then dipping the injection opening into a liquid crystal tank, and then introducing a normal pressure. After injection of the liquid crystal, the injection opening was sealed. A polarizing plate was then fixed to the outside surface of the base plate, thereby producing a cell. The contrast of the thus-produced liquid crystal display device was lower than that of the liquid crystal display device provided with the colored layer-laminated spacer, due to light leakage and light scatter through beads and orientation defects caused by damage to the alignment layer. Moreover, display irregularity was considerable, probably caused by gap irregularity. Further, the TFT-carrying base plate was damaged by beads during the production process, resulting in a reduced yield.

COMPARATIVE EXAMPLE 2

Production of Color Filter

A color filter provided with a colored layer-laminated spacer was produced by sequentially patterning a resin black matrix and colored layers on a non-alkali glass substrate in substantially the same manner as in Example 1.

Production of Color Liquid Crystal Display Device

An ITO film was mask-formed on the color filter by sputtering. The ITO film had a film thickness of 1500 Å, and a surface resistance of 20Ω/□. A polyimide-based film was formed on the ITO film, and subjected to rubbing.

A transparent electrode base plate equipped with TFTs was produced as described below.

First, a chrome film was formed on a transparent non-alkali glass substrate (OA-2 by Nippon Denki Glass Kabushiki Gaisha) by vapor deposition. Gate electrodes were patterned in the chrome film by photoetching. Then, a silicon nitride (SiNx) film was formed to a thickness of about 5000 Å by plasma CVD, thereby forming an insulating film. Subsequently, an amorphous silicon (a-Si) film and an SiNx film as an etching stopper film layer were serially formed. The etching stopper layer of SiNx was patterned by photoetching. In this etching process, sites that contact spacer elements were left unetched so that SiNx layer elements having an average area per element of about 250 $\mu m^2$ were formed. An $n^+$a-Si for ohmic contact was formed and patterned, and a film of transparent electrodes (ITO) that form display electrodes was formed and patterned. Further, aluminum was vapor-deposited as a wiring material on the entire surface, and formed into drain electrodes and source electrodes by photoetching. Using the drain and source electrodes as a mask, $n^+$a-Si in the channel portions was removed by etching, thereby producing TFTs.

A polyimide-based alignment layer was formed on the base plate and subjected to rubbing, as in the color filter.

The color filter provided with the alignment layer was fixed to the transparent electrode base plate equipped with TFTs, using a sealant. A liquid crystal was then injected through an injection opening formed in the seal, by leaving the empty cell under a reduced pressure, then dipping the injection opening into a liquid crystal tank, and then introducing a normal pressure. After injection of the liquid crystal, the injection opening was sealed. A polarizing plate was then fixed to the outside surface of the base plate, thereby producing a cell. In the liquid crystal display device thus produced, the spacer partially contacted the display electrodes of the TFT base plate and therefore caused a short circuit between electrodes, thus producing bright spot display defects.

COMPARATIVE EXAMPLE 3

A color filter was produced by substantially the same procedure as in Example 1, except that the pigment dispersing time during preparation of each colored layer was reduced to 10 minutes. The surface roughness of each colored layer was measured by a surface roughness tester, providing a surface roughness of 0.020 $\mu$m.

Using the color filter, a liquid crystal display device was produced by substantially the same procedure as in Example 1. In the liquid crystal display device, display defects were caused by orientation failure in the liquid crystal.

The color filter of the present invention wherein a spacer formed by patterning resin layers is provided on a black matrix on a color filter base plate, and the liquid crystal display apparatus of the present invention that employs the color filter and is driven by lateral electric fields, achieve various advantages as follows:

(1) Since the spacer does not exist in a pixel portion, deterioration of the display quality caused by light scatter and transmission by the spacer is eliminated so that display contrast in particular is improved.

(2) Since spacer elements are regularly fixed and arranged on the black matrix and in a non-display area outside the screen area, the cell gap becomes uniform so that no display irregularity caused by gap inconsistency is exhibited.

(3) Since there is no need to provide transparent electrodes on the color filter, the possibility of a short circuit between electrodes when the base plates are being joined is eliminated, thereby making it easier to produce a color filter provided with a spacer.

What is claimed is:

1. A liquid crystal display apparatus comprising:
   a color filter base plate comprising a transparent substrate, a resin black matrix formed by dispersing a light-shielding agent therein and a colored film of three primary colors provided on the transparent substrate,
   an electrode-carrying base plate provided with electrodes for applying an electric field parallel to the color filter base plate,
   a liquid crystal disposed between said color filter base plate and said electrode-carrying base plate,
   a first alignment layer,
   an overcoat film on the colored film,
   a second alignment layer on the overcoat film, and
   a spacer formed on the resin black matrix by patterning a resin wherein the overcoat film has a surface roughness of 0.01 $\mu$m or less in terms of an Ra value.

2. A liquid crystal display apparatus according to claim 1, wherein the spacer is formed by laminating colored films of three primary colors.

3. A liquid crystal display apparatus according to claim 1, wherein the colored film has a relative dielectric constant less than 4.5.

4. A liquid crystal display apparatus according to claim 3, wherein the colored film has a relative dielectric constant of 3.6 or less.

5. A liquid crystal display apparatus according to claim 1, wherein the colored film has been directly subjected to orientation treatment.

6. A liquid crystal display apparatus according to claim 1, wherein the colored film has a surface roughness of 0.010 $\mu$m or less in terms of Ra value.

7. A liquid crystal display apparatus according to claim 1, wherein the overcoat film having a relative dielectric constant of 4.5 or less.

8. A liquid crystal display apparatus according to claim 7, wherein the overcoat film has a relative dielectric constant of 3.6 or less.

9. A color filter according to any one of claims 1 to 8, wherein the overcoat film is a polyimide film or a polyimide siloxane film.

10. A liquid crystal display apparatus according to claim 1, wherein the resin for the resin black matrix is a polyimide.

11. A liquid crystal display apparatus according to claim 1, wherein the resin for the colored films of three primary colors is a polyimide.

12. A liquid crystal display apparatus according to claim 1, further comprising an electrically conductive transparent film formed on a reverse side of the transparent substrate.

13. A liquid crystal display apparatus according to claim 10, wherein the electrically conductive transparent film has a specific resistance of 2 kΩ·cm or less.

14. A liquid crystal display apparatus according to claim 10, wherein the electrically conductive transparent film has a light transmittance of 96% or more.

15. A liquid crystal display apparatus according to any one of claims 10 to 12, wherein the electrically conductive transparent film has a film thickness of 10 nm to 100 nm.

* * * * *